United States Patent [19]

Frank

[11] 3,946,231

[45] Mar. 23, 1976

[54] LIQUID SCINTILLATION COUNTING SYSTEM WITH AUTOMATIC GAIN CORRECTION

[75] Inventor: Richard B. Frank, Deerfield, Ill.

[73] Assignee: G. D. Searle & Co., Skokie, Ill.

[22] Filed: June 12, 1968

[21] Appl. No.: 736,537

[52] U.S. Cl.................................. 250/328; 250/361
[51] Int. Cl.² .......................................... G01T 7/08
[58] Field of Search............ 250/106 SC, 71.5, 361, 250/328

[56] References Cited
UNITED STATES PATENTS

| | | | |
|---|---|---|---|
| 3,089,955 | 5/1963 | Scherbutskoy...................... | 250/71.5 |
| 3,091,463 | 5/1963 | Cohen et al. .................. | 250/71.5 X |
| 3,101,409 | 8/1963 | Fite.................................... | 250/71.5 |
| 3,188,468 | 6/1965 | Packard............................. | 250/71.5 |
| 3,296,438 | 1/1967 | Main.................................. | 250/71.5 |
| 3,393,313 | 7/1968 | Harwick.......................... | 250/71.5 X |
| 3,428,804 | 2/1969 | Comunnetti....................... | 250/71.5 |
| 3,480,778 | 11/1969 | Meeder et al................ | 250/106 SC |
| 3,560,744 | 2/1971 | Jordan ........................... | 250/71.5 R |

*Primary Examiner*—Archie R. Borchelt
*Attorney, Agent, or Firm*—Walter C. Ramm; Peter J. Sgarbossa; Helmuth A. Wegner

[57] ABSTRACT

Automatic liquid scintillation counting apparatus including a scintillating medium in the elevator ram of the sample changing apparatus. An appropriate source of radiation, which may be the external source for standardizing samples, produces reference scintillations in the scintillating medium which may be used for correction of the gain of the counting system.

9 Claims, 8 Drawing Figures

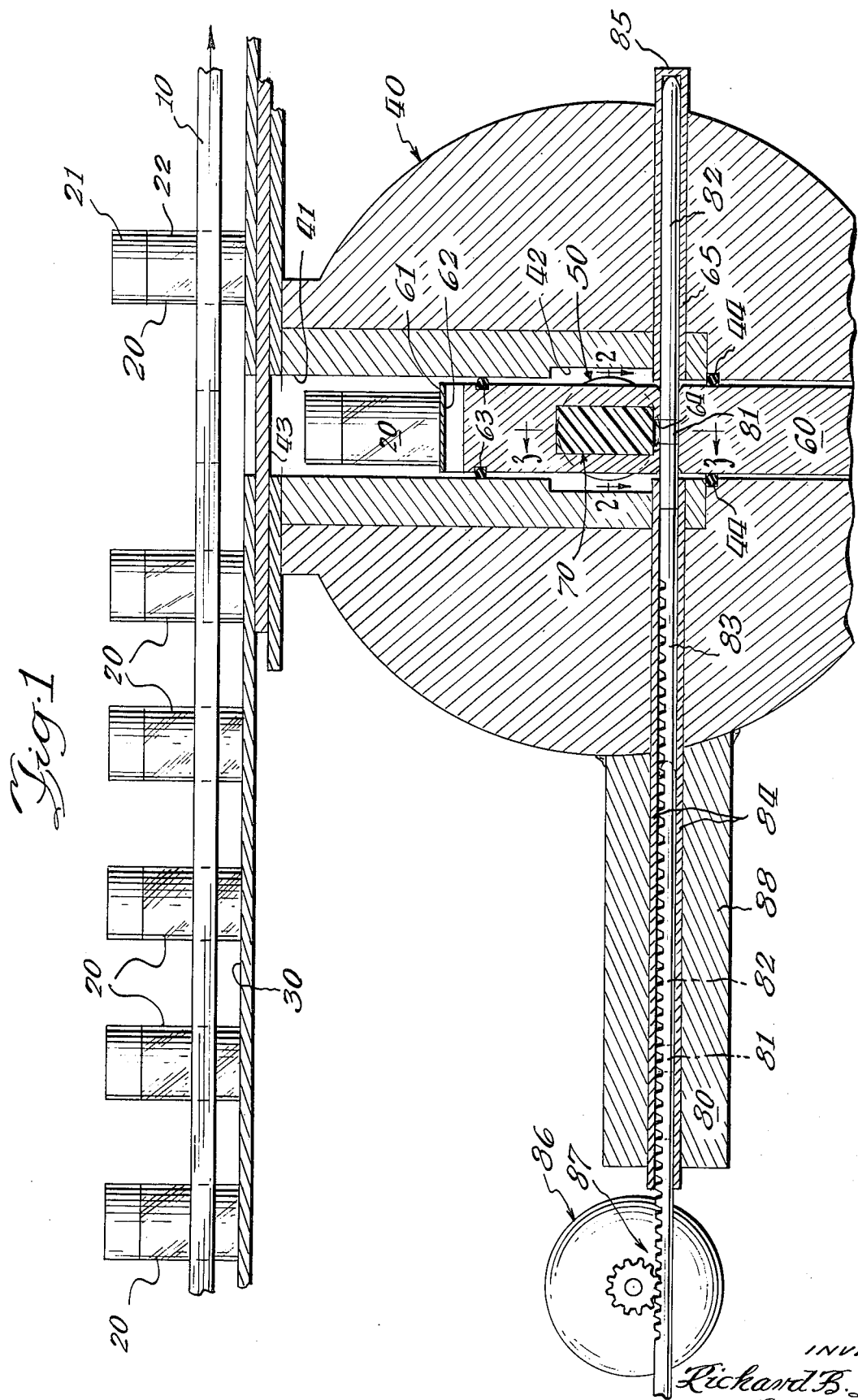

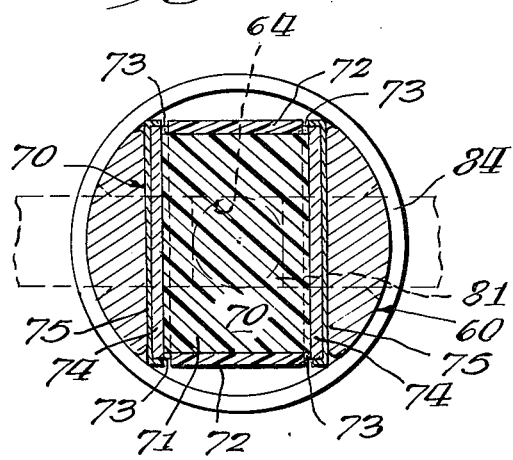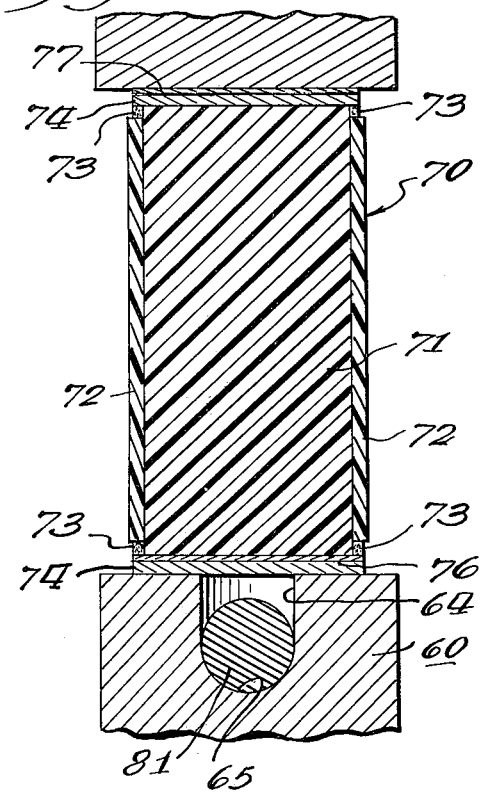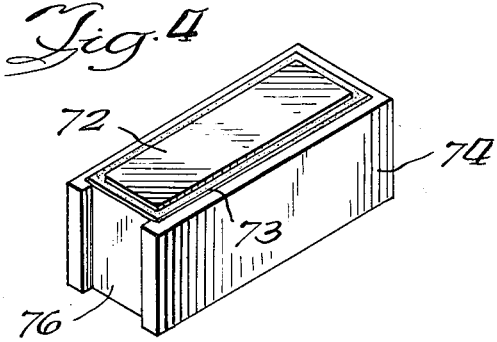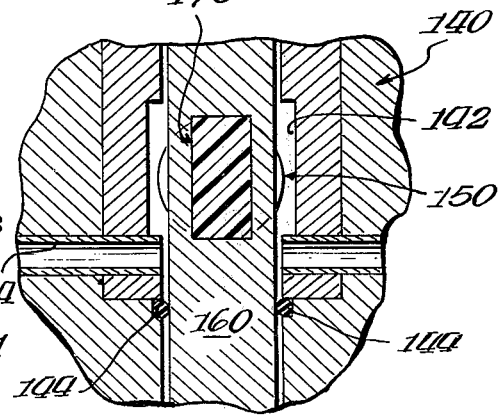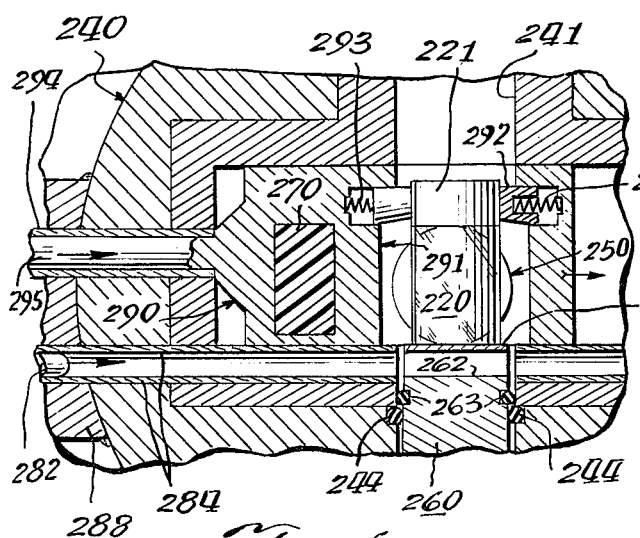

LIQUID SCINTILLATION COUNTING SYSTEM WITH AUTOMATIC GAIN CORRECTION

In a co-pending patent application of Laney, "Error Correction in Radioactive Sample Measurements," Ser. No. 703,938, filed Feb. 8, 1968, now U.S. Pat. No. 3,609,362, the need for automatic gain correction in a liquid scintillation counting system is disclosed. As discussed in that co-pending application, one of the necessary aspects of a gain correction feature is the provision of standard or reference scintillations within the counting chamber at periodic intervals. It is, of course, desirable that such provision of reference scintillation be accomplished in an advantageous manner.

Therefore, the principal object of this invention is to provide an improved automatic liquid scintillation counting system wherein system gain correction is automatically accomplished.

A further object of this invention is to provide an advantageous arrangement for providing reference scintillations for gain correction purposes in an automatic liquid scintillation counting system.

Another object of this invention is to provide an arrangement wherein a means providing reference scintillations or gain correction is advantageously associated with the sample changing apparatus of an automatic liquid scintillation counting system.

A preferred embodiment of this invention features a body of scintillating phosphor mounted in an elevator ram which is part of the sample changing apparatus. Thus, in the process of sample changing, the body of scintillating phosphor is automatically brought into the counting chamber. Reference scintillations in the scintillating phosphor may be produced, alternatively, by internal or external radioactive sources or other sources of radiation which produce an appropriate scintillation intensity spectrum. For example, the phosphor may be a liquid scintillating medium with a radioactive source of alpha particles dissolved therein, or it may be a solid scintillating medium with a radioactive source of alpha particles dispersed therein. On the other hand, the phosphor may be a solid scintillation crystal with an external radioactive source of gamma rays exposed thereto when the crystal is within the counting chamber. This radioactive source of gamma rays may be advantageously the same external radioactive source used for standardizing liquid scintillation samples introduced into the counting chamber. One such external gamma ray source often employed for standardization is $Ba^{133}$. This isotope produces a scintillation intensity spectrum in a thallium-activated sodium iodide crystal which includes a spectral peak in the 355–380 KEV range that may conveniently be used as a reference scintillation spectrum for gain correction purposes.

The advantages of associating the sample transfer and reference scintillation functions of the apparatus in the manner of this invention include the full automation of the gain correction function and the relative integration of that function with the sample counting and standardization function. That is, the reference scintillations are available during every sample changing, counting and standardizing cycle so that a simple timer can control the interval between gain correction operations. Operator handling of the reference scintillation medium is not required, and no reduction of the sample handling capacity of the apparatus is involved.

Other objects, features, and advantages of this invention and a complete understanding thereof will be obtained from a consideration of the following detailed description in conjunction with the accompanying drawings in which:

FIG. 1 is an essentially schematic diagram of a portion of the mechanical apparatus of an automatic liquid scintillation counting system illustrating one embodiment of this invention;

FIG. 2 is a section view of a scintillation crystal elevator ram assembly taken along the lines 2—2 in FIG. 1;

FIG. 3 is a section view of a scintillation crystal elevator ram assembly taken along the lines 3—3 in FIG. 1;

FIG. 4 is an isometric view of the scintillation crystal shown in section in FIGS. 2 and 3;

FIG. 5 is an essentially schematic view of an alternate embodiment of this invention corresponding in part to the apparatus shown in FIG. 1;

FIG. 6 is an essentially schematic diagram of a second alternate embodiment of this invention with a partial correspondence with the apparatus shown in FIG. 1;

Figure 7:
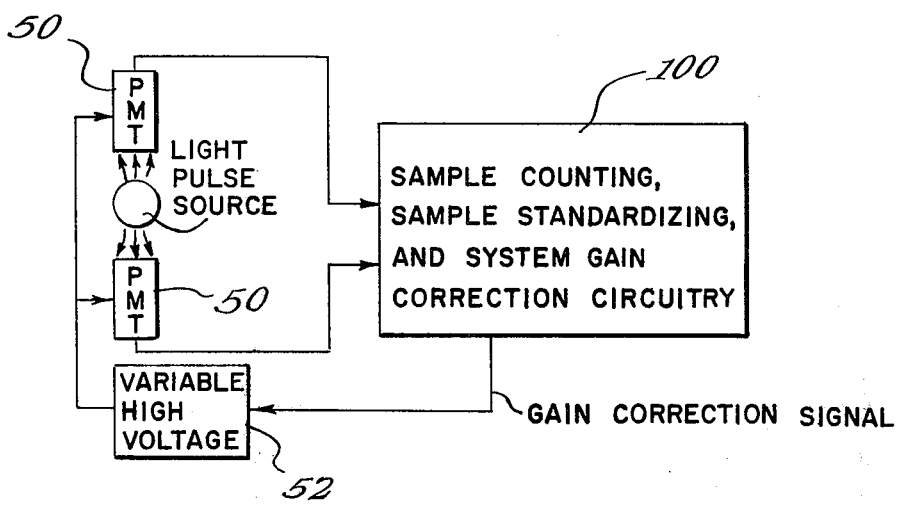
FIG. 7 is a block schematic diagram of an automatic liquid scintillation counting system which may incorporate this invention.

In FIG. 1 portions of the sample conveying, sample changing and external standardization mechanisms of an automatic liquid scintillation counting system are shown in conjunction with a reference scintillation arrangement according to this invention. Sample conveyor 10 conveys a plurality of liquid scintillation samples 20 on a table 30. These liquid scintillation samples are brought by conveyor 10 to a sample transfer station above passageway 41 in shield 40. Sample conveyor 10 may be any of the wellknown sample conveying mechanisms in use today, such as, for example, the conveyor described in detail in Meeder et al U.S. Pat. No. 3,206,006, which issued on Sept. 14, 1965. The liquid scintillation samples 20 are typically sample-containing vials comprising a light transparent bottom portion 22 and a screw-on cap 21. The vials will usually contain a liquid scintillating phosphor with a sample dissolved therein, the sample typically being a matrix of some sort, such as human or animal tissue, which is labelled with a radioactive tracer material such as tritium or carbon-14.

Shield 40 defines an internal counting chamber 42 and a passageway 41 connecting counting chamber 42 to the sample transfer station. Typically, shield 40 includes a large volume of high density material, such as lead, to eliminate substantially the impingement of external radiation on any scintillating media within counting chamber 42. Reference numeral 43 refers to a light shutter which opens and closes alternately to permit the passage of samples 20 into passageway 41 and to prevent light from entering passageway 41 after the entry of a sample 20 into counting chamber 42. This shutter cooperates with an annular light sealing ring 63 on elevator ram 60. This lighttight sample transfer apparatus is more completely described in Meeder et al U.S. Pat. No. 3,163,756, issued on Dec. 19, 1964.

Various types of sample changing mechanisms involving elevator ram 60 and light shutter 43 can be utilized. Particular embodiments of various sample changing apparatus are shown in Rowan et al U.S. Pat.

No. 3,283,151, issued Nov. 1, 1966, and a co-pending application of Hausser entitled, "Scintillation Counter," Ser. No. 541,763, filed Apr. 11, 1966. As shown, elevator ram 60 has a platform 61 on which a liquid scintillation sample 20 rides. Closely beneath platform 61 is an aperture 62 traversing the diameter of elevator ram 60. As noted above, an annular light sealing ring 63 surrounds elevator ram 60 to prevent light entering passageway 41 while shutter 43 is open from entering counting chamber 42. A distance beneath aperture 62 and light sealing ring 63 is a scintillation crystal assembly 70 which is shown positioned within counting chamber 42. Closely beneath scintillation crystal assembly 70 is a second aperture 65 through ram 60 and an aperture 64 which connects aperture 65 with the bottom of scintillation crystal assembly 70.

Radioactive source assembly 80 includes a radioactive source 81 mounted in an elongated cylindrical rod 82 which is attached to a drive rod 83. Both of the rods 82 and 83 ride in track 84 which extends through an auxiliary shield 88 and shield 40. A rack and pinion mechanism 87 operated by a reversible motor 86 moves rods 82 and 83 back and forth and in track 84, thereby positioning source 81, alternatively, in a remote location, shown in dotted line, and an operative location, shown in solid line. Rod 82 may be inserted either through aperture 65 or aperture 62 in elevator ram 60 so that source 81 may be located either under sample 20 or crystal assembly 70. End 85 of track 84 stops the travel of rod 82 to position source 81 precisely with respect to either sample 20 or crystal assembly 70. Additional details regarding the construction and operation of this source positioning apparatus with respect to its sample standardizing function are given in a co-pending application of Meeder et al entitled, "Liquid Scintillation Sample Standardization Apparatus," Ser. No. 541,767, filed Apr. 11, 1966.

The operation of the apparatus shown in FIG. 1 will now be described in conjunction with FIGS. 7 and 8. Sample conveyor 10 transports samples 20 one by one to a sample transfer position above passageway 41. At such time as samples 20 are being conveyed, elevator ram 60 is in an uppermost position such that platform 61 is aligned with table top 30. Naturally, source rod 82 is in its remote location at this time, and shutter 43 is open. When a sample 20 is positioned on platform 61, the sample changing apparatus is activated to lower sample 20 into passageway 41 past shutter 43. With sample 20 wholly within passageway 41, shutter 43 closes to prevent light from entering passageway 41. The sample changing apparatus, which includes elevator ram 60, may be programmed such that sample 20 is brought to rest at a position within passageway 41 beneath shutter 43 whereat crystal assembly 70 is positioned within counting chamber 42. An appropriate mechanism can be employed to signal the proper closing of shutter 43 at this time. With ram 60 in this position, source rod 82 may be driven through aperture 65 to locate source 81 beneath crystal assembly 70. Radiation from source 81 will thus impinge upon a scintillation crystal in crystal assembly 70 and produce reference scintillations which are then presented to a pair of photomultipliers 50 (only one shown) associated with counting chamber 42.

System gain correction on the basis of the reference scintillations produced within counting chamber 42 during a programmed gain correction interval may be performed by any appropriate electronic circuitry associated with photomultipliers 50. For example, the gain correction circuitry described in the above-mentioned co-pending Laney application may be employed.

In FIG. 7 the basic electronic components of an automatic liquid scintillation counting system with a gain correction feature are shown in block diagram form. Photomultipliers 50 transduce light pulses or scintillations from any light pulse source within counting chamber 42 into electrical pusles which are sent to appropriate circuitry 100. Typically, the separate electrical pulses from the pair of photomultipliers are summed to produce a single electrical pulse which corresponds in amplitude to the intensity of the light pulse or scintillation. This correspondence between pulse amplitude and scintillation intensity varies as the gain of the system varies. This variance will be exhibited in the pulse amplitude spectrum which is produced by reference scintillations in counting chamber 42 as is demonstrated in FIG. 8.

Figure 8:
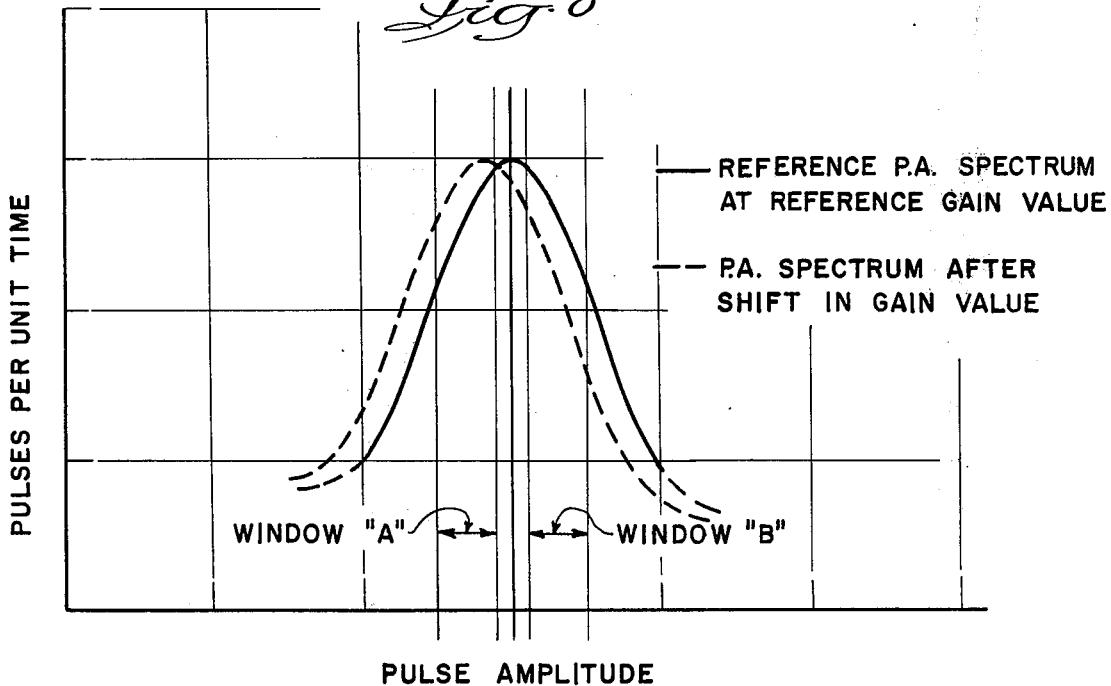
FIG. 8 is a graph of a portion of a scintillation intensity spectrum useful in explaining the gain correction operation involved in this invention.

In FIG. 8 a reference pulse amplitude spectrum which exists at a reference gain value is shown to be shifted in response to a change in the value of system gain. This reference spectrum is only a portion of the complex total spectrum of a gamma emitting isotope such as $Ba^{133}$ in a scintillation crystal such as NaI (T1), and it is segregated for purposes of illustration since it is the portion utilized for gain correction purposes. The shift in the reference spectrum may be ascertained, as discussed in the co-pending Laney application, by detecting count rate imbalance between two "windows" positioned on opposite sides of the peak of the spectrum at reference gain value. Gain correction may then be accomplished by adjusting the gain in the proper direction to bring the count rates in windows "A" and "B" back into balance. As shown in FIG. 7, gain correction may be performed by an appropriate gain correction signal to a variable high voltage supply 52 powering photomultipliers 50.

After gain correction has been completed, a signal to the source location apparatus may be used to produce withdrawal of source rod 82 into its remote location. Elevator ram 60 may then continue its downward travel until sample 20 is positioned within counting chamber 42. At this time, the scintillations produced in sample 20 will be presented to photomultipliers 50 and counting of the sample activity by associated electronic circuitry may be effected. After counting of the sample, source rod 82 may then be inserted through aperture 62 in ram 60 so that source 81 produces scintillations in sample 20 for sample standardizing purposes. After a standardizing counting period, source rod 82 may again be withdrawn to its remote position, and the sample changing apparatus may cause elevator ram 60 to return sample 20 through passageway 41 to conveyor 10. Conveyor 10 may then index the next sample 20 in position on platform 61 of ram 60, and the whole process of sample changing, counting, and standardizing may be repeated.

Typically, the gain correction period need not be instituted during every sample changing operation so that some of the samples 20 may pause in passageway 41 only briefly enough to permit the closure of shutter 43 and the ascertaining of such closure. Source rod 82 would not be inserted, and no reference scintillations would be produced within counting chamber 42.

It should be understood that the production of reference scintillations within counting chamber 42 may be accomplished during the sample changing cycle merely by calling for the introduction of source rod 82 at any time that crystal assembly 70 is properly positioned within counting chamber 42. Thus it should be apparent that many variations in this operation could easily be implemented. For example, the production of reference scintillations could just as easily take place by stopping elevator ram 60 in its upward travel as it is returning sample 20 to conveyor 10. Moreover, scintillation crystal assembly 70 and apertures 65 and 64 in elevator ram 60 could be located such that scintillation crystal assembly 70 would be within counting chamber 42 when elevator ram 60 has fully returned a sample 20 to conveyor 10. Thus, many variations of the general technique for producing reference scintillations described above could be implemented by either changing the position of the scintillation crystal assembly in elevator ram 60 or by programming the insertion of rod 82 at various different times in the sample changing cycle.

The constructional details of the scintillation crystal assembly 70 and its mounting within elevator ram 60 will now be described with reference to the various section views shown in FIGS. 2 and 3 and the isometric view shown in FIG. 4. Scintillation crystal assembly 70 includes a scintillation crystal 71 which may be a solid block of thallium-activated sodium iodide. As can best be seen in FIG. 4, scintillation crystal 71 is enclosed on two of its sides and its top by a metallic wall 74 which may be of aluminum. A thin wall 76 (also of aluminum) covers the bottom of crystal 71 and a portion of wall 74 extends over the end portions of thin wall 76, as can best be seen in FIG. 4.

A pair of optical windows 72 are mounted to opposing sides of crystal 71 by a surrounding epoxy material 73. A pair of metallic spring shims 75 may be mounted on the side walls and another such shim 77 on the top wall to mount crystal assembly 70 securely in elevator ram 60. As shown best in FIG. 3, radioactive source 81 can be inserted in aperture 65 of elevator ram 60 beneath crystal assembly 70. Radiation from source 81 will traverse aperture 65 and penetrate thin wall 76 into crystal 71 thereby producing scintillations within crystal 71. Crystal 71 and windows 72 are transparent to the scintillations produced so that the light photons associated with said scintillations will travel out of crystal 71 through the windows 72 and will impinge upon the pair of photomultiplier tubes (not shown) viewing windows 72.

In FIG. 5 an alternative embodiment of this invention is shown. In this embodiment, a body of scintillating phosphor 170 is mounted in elevator ram 160. This body of scintillating phosphor has internally associated with it a source of radiation for producing scintillations therein. As such, the scintillating phosphor may be a liquid scintillator with a radioactive source of alpha particles at least partially dissolved in the liquid scintillator. Alternatively, the scintillating phosphor may be a solid scintillation crystal, such as thallium-activated sodium iodide with a radioactive source of alpha particles at least partially dispersed therein. Other types of scintillating material and other types of radioactive source material associated therewith may also be employed, provided only that the source and scintillating media together must produce a reference scintillation intensity spectrum having an appropriate peak for gain correction purposes. It will be noted that, in this embodiment, no calling it play of an external radioactive source is required and, accordingly, no aperture in elevator ram 160 is provided. The operation of the embodiment shown in FIG. 5 is essentially the same as that shown in FIG. 1 except that reference scintillations will always be presented to photomultiplier 150 within counting chamber 142 during the up and down movement of elevator ram 160. However, elevator ram 160 must still pause in a position such that scintillation crystal assembly 170 remains in counting chamber 142 during an appropriate gain correction interval.

In FIG. 6 a second alternative embodiment is shown. In this embodiment a body of scintillating phosphor 270 is mounted in a separate reciprocating mechanism 290 which is operatively associated with elevator ram 260. Reciprocating assembly 290 defines its own chamber 291 which is moveable with respect to photomultipliers 250. A liquid scintillation sample 220 may be brought into chamber 291 when assembly 290 is in its left hand position. A plurality of fingers 292, loaded by springs 293, grip the cap 221 of a liquid scintillation sample introduced into chamber 291 to maintain the sample in a fixed position within the chamber when the chamber and sample are moved. Some mechanism for restraining fingers 292 during entry of a sample 220 may be required if the weight of the samples is insufficient to overcome the friction otherwise presented.

A rod 295 which is reciprocal in a track 294 may be used to shift assembly 290 from left to right and back again as desired. Any appropriate mechanism such as a rack and pinion similar to the one shown in FIG. 1 for driving the external source rod may be used in conjunction with rod 295 for this purpose. When assembly 290 is moved to its right hand position, scintillation assembly 270 will be presented to photomultiplier tubes 250. At the same time, sample 220 will move into a remote location, sliding off elevator ram 260.

Any number of the alternative ways of producing reference scintillations may be employed in this embodiment. Thus, scintillation assembly 270 may be essentially the same as assembly 70 shown in FIGS. 2 through 4, and radioactive source 281 mounted in rod 282 may be used to produce scintillations within the sodium iodide crystal in the same fashion as it produces scintillations within a sample 220. On the other hand, scintillation assembly 270 may comprise the combination of a liquid scintillating medium with a radioactive source of alpha particles dissolved therein or a solid scintillation crystal with a radioactive source of alpha particles dispersed herein, or any other combination of a radiation source and a scintillating medium. If scintillation assembly 270 involves a radioactive source permanently associated with a scintillating medium, reference scintillations would automatically be presented to photomultipliers 250 upon moving assembly 290 into its right hand position.

It should be understood that this invention is not limited to the particular embodiments described above. For example, other mechanisms and arrangements for bringing an external radioactive source into operative relationship with a scintillator in the counting chamber of a liquid scintillation counting system are presently known and could be employed in a manner similar to the embodiment shown in FIG. 1. In addition, it should be noted that the embodiments shown in FIGS. 5 and 6 can be employed in a system wherein no provision for standardization of samples is made. In this same connection, the embodiment of FIG. 1 could be varied to exclude aperture 62 in ram 60 if no standardization of samples is to be performed.

Thus, it is apparent that numerous modifications in the above-described embodiments could be made without departing from the scope of this invention as claimed in the following claims.

I claim:

1. In an automatic liquid scintillation counting system,
conveyor means for delivering a plurality of liquid scintillation samples to a sample transfer station;
shielding means positioned adjacent same sample transfer station and defining a counting chamber spaced from said station and a passageway interconnecting said station and said chamber;
transducer means associated with said counting chamber for converting scintillations within said chamber into electrical pulses corresponding in amplitude to the intensities of said scintillations;
sample transfer means operatively associated with said counting chamber and said passageway and including an elevator ram adapted to traverse said counting chamber and said passageway for transporting said samples between said sample transfer station and said chamber;
scintillation means operatively associated with said sample transfer means for automatically producing reference scintillations in said counting chamber when said samples are positioned outside said chamber by said sample transfer means and including a body of scintillating phosphor mounted in said elevator ram in a position such that said body is exposed to said transducer means in said counting chamber when an upper portion of said elevator ram is positioned within said passageway; and
circuit means operatively associated with said transducer means for automatically adjusting the gain of said counting system in accordance with said reference scintillations.

2. Apparatus as claimed in claim 1, wherein said scintillation means further includes a source of reference radiation permanently associated with said body of scintillating phosphor to produce said reference scintillations therein on a continuous basis.

3. Apparatus as claimed in claim 2, wherein said scintillating phosphor is a liquid scintillating phosphor, and said source of reference radiation is a radioactive source of alpha particles at least partially dissolved in said liquid scintillating phosphor.

4. Apparatus as claimed in claim 2, herein said scintillating phosphor is a solid scintillating medium, and said source of reference radiation is a radioactive source of alpha particles at least partially dispersed in said solid scintillating medium.

5. Apparatus as claimed in claim 1, wherein said scintillation means further includes a source of reference radiation adapted to produce said reference scintillations in said body of scintillating phosphor, and means for exposing said body of scintillating phosphor to said reference radiation when said body is within said counting chamber.

6. Apparatus as claimed in claim 5, wherein said body of scintillating phosphor is a solid scintillation crystal; said source of reference radiation comprises a rod having a radioactive source mounted thereto; and said elevator ram includes a first aperture receiving said crystal and a second aperture communicating with said first aperture and removably receiving said rod; said means for exposing including means for inserting said rod in said second aperture when said crystal is positioned within said counting chamber.

7. In an automatic liquid scintillation counting system,
conveyor means for delivering a plurality of liquid scintillation samples to a sample transfer station;
shielding means positioned adjacent said sample transfer station and defining a counting chamber spaced from said station and a passageway interconnecting said station and said chamber;
transducer means associated with said counting chamber for converting scintillations therein having a spectrum of intensities into electrical pulses having a spectrum of amplitudes directly corresponding to said spectrum of intensities in accordance with the gain value of said transducer means;
sample transfer means for transporting said samples between said sample transfer station and said counting chamber, including an elevator ram traversing said chamber and said passageway; said elevator ram having a platform on the top thereof on which said samples ride and having a solid scintillation crystal mounted therein at a location beneath said platform such that said crystal is positioned within said chamber when a sample on said platform is without said chamber; and
means for alternatively exposing said samples and said crystal to a source of penetrating reference radiations when said samples and said crystal are within said sample counting chamber to produce efficiency-correction scintillations in said samples and reference scintillations in said crystal.

8. Apparatus as claimed in claim 7, wherein said elevator ram defines a first aperture beneath said platform and a second aperture beneath said solid scintillation crystal; and said means for alternatively exposing said samples and said crystal includes means for supporting a radioactive source in disoperative association with respect to said samples and said crystal, and means for alternatively inserting said radioactive source into said first and second apertures when said samples and said crystal, respectively, are positioned within said counting chamber.

9. Apparatus as claimed in claim 7, further comprising circuit means operatively associated with said transducer means to produce a sample activity count and an efficiency-correction count for each of said samples and to adjust the overall gain of said counting system in accordance with said reference scintillations in said crystal.

* * * * *